US011780596B2

United States Patent
Le Bras (10) Patent No.: US 11,780,596 B2
(45) Date of Patent: Oct. 10, 2023

(54) AIRCRAFT EVACUATION SYSTEM WITH HYDROGEN INFLATION

(71) Applicant: ZeroAvia, Inc., Hollister, CA (US)

(72) Inventor: Kevin Le Bras, Santa Cruz, CA (US)

(73) Assignee: ZeroAvia, Inc., Hollister, CA (US)

(*) Notice: Subject to any disclaimer, the term of this patent is extended or adjusted under 35 U.S.C. 154(b) by 0 days.

(21) Appl. No.: 17/657,128

(22) Filed: Mar. 29, 2022

(65) Prior Publication Data

US 2022/0324579 A1 Oct. 13, 2022

Related U.S. Application Data

(60) Provisional application No. 63/168,616, filed on Mar. 31, 2021.

(51) Int. Cl.
*B64D 25/14* (2006.01)
*B64D 37/30* (2006.01)
*B64D 27/24* (2006.01)

(52) U.S. Cl.
CPC ............ *B64D 25/14* (2013.01); *B64D 27/24* (2013.01); *B64D 37/30* (2013.01)

(58) Field of Classification Search
CPC ................................. B64D 25/14; B64D 37/30
See application file for complete search history.

(56) References Cited

U.S. PATENT DOCUMENTS

| | | |
|---|---|---|
| 2004/0195457 A1 | 10/2004 | Baker et al. |
| 2014/0291449 A1 | 10/2014 | Knepple et al. |
| 2015/0308383 A1 | 10/2015 | Hoffjann et al. |
| 2016/0107733 A1 | 4/2016 | Thomson |
| 2018/0002030 A1 | 1/2018 | Klassen et al. |
| 2021/0151783 A1 | 5/2021 | Miftakhov |

FOREIGN PATENT DOCUMENTS

WO 2022212278 A1 10/2022

OTHER PUBLICATIONS

ISA/EP, Search Report for International Application No. PCT/US22/22182, 13 pages, dated Jul. 15, 2022.

*Primary Examiner* — Philip J Bonzell
*Assistant Examiner* — Justin Michael Heston (57) ABSTRACT

A system and method for an aircraft evacuation system with hydrogen inflation is disclosed. The system includes an aircraft having an integrated hydrogen-electric engine. A fuel cell stack for powering an aircraft motor of the integrated hydrogen-electric engine. A hydrogen fuel source in fluid communication with the fuel cell stack, the hydrogen fuel source containing hydrogen. An inflatable slide and a pump operably coupled with the hydrogen fuel source and the inflatable slide to selectively pump the hydrogen to the inflatable slide for inflating the inflatable slide.

14 Claims, 5 Drawing Sheets

AIRCRAFT EVACUATION SYSTEM WITH HYDROGEN INFLATION

CROSS-REFERENCE TO RELATED APPLICATIONS (PROVISIONAL)

This application claims priority to and benefit of U.S. Provisional Patent Application No. 63/168,616 filed on Mar. 31, 2021, entitled "AIRCRAFT EVACUATION SYSTEM WITH HYDROGEN INFLATION" by Kevin Le Bras, and assigned to the assignee of the present application, the disclosure of which is hereby incorporated by reference in its entirety.

FIELD OF THE INVENTION

Embodiments of the present technology relate generally to aircraft, and more particularly, to clean energy-based aircraft having inflatable evacuation systems.

BACKGROUND

In air in the aviation market, the high maintenance and fuel costs for traditional turbine engines drive operating costs for the airlines and other types of operators. Additionally, the continued growth of fossil fuel aviation is increasingly contributing to the particulate pollution around the airports, increased reliance on fossil fuel extraction, as well as the growing climate change impacts. The highspeed exhaust gases of the traditional turbine engines contribute significantly to the extremely large noise footprint associated with aviation, especially in the densely populated areas.

Highly integrated hydrogen-electric engines present a means of reducing aircraft noise and heat signatures, improving component reliability, increasing the useful life of the engine, limiting environmental pollution, and decreasing the probability of failure per hour of operation. Aircraft that employ such hydrogen-electric engines will still need to provide a safe means of deboarding passengers in emergency situations.

BRIEF DESCRIPTION OF THE DRAWINGS

Aspects of the present invention are illustrated by way of example, and not by way of limitation, in the accompanying drawings, wherein.

The drawings referred to in this description should be understood as not being drawn to scale except if specifically noted.

DESCRIPTION OF EMBODIMENTS

The detailed description set forth below in connection with the appended drawings is intended as a description of various embodiments of the present invention and is not intended to represent the only embodiments in which the present invention is to be practiced. Each embodiment described in this disclosure is provided merely as an example or illustration of the present invention, and should not necessarily be construed as preferred or advantageous over other embodiments. In some instances, well known methods, procedures, objects, and circuits have not been described in detail as not to unnecessarily obscure aspects of the present disclosure.

Figure 1A:
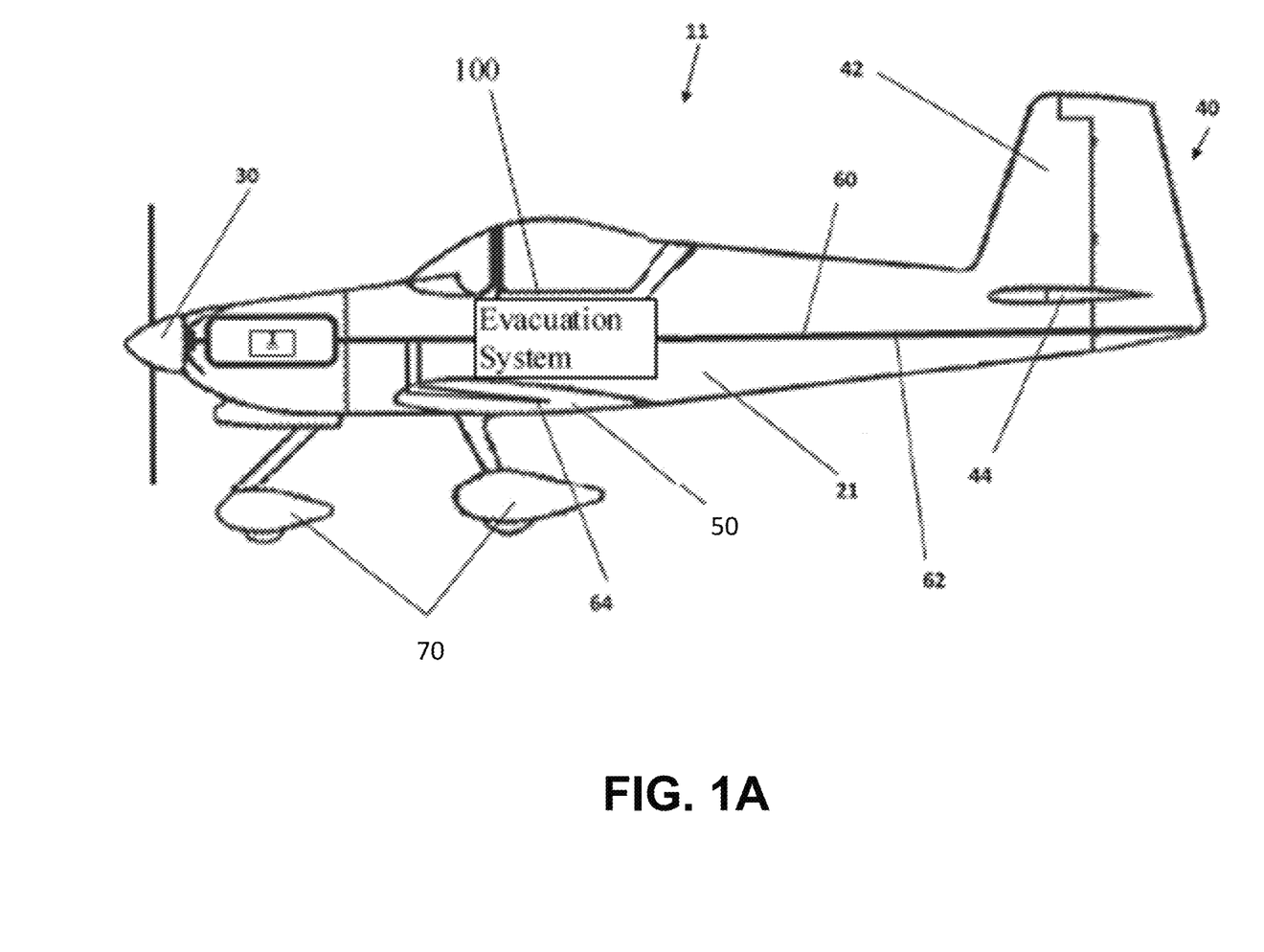
FIG. 1A is a side view of a hydrogen fuel cell-powered aircraft in accordance with an embodiment.

Referring to FIG. 1A, a hydrogen fuel cell-powered aircraft 11 is shown in accordance with an embodiment. In one embodiment, hydrogen fuel cell-powered aircraft 11 is a turboprop aircraft. In another embodiment, hydrogen fuel cell-powered aircraft 11 is another aircraft type/configuration other than a turboprop. Thus, the turboprop hydrogen fuel cell-powered aircraft 11 disclosed is one embodiment and is provided for purposes of clarity in the following discussion.

Hydrogen fuel cell-powered aircraft 11 generally includes a fuselage 21, a propulsor 30 (e.g., a propeller) disposed at a forward end of fuselage 20, a tail 40 disposed at a rear end of fuselage 20 and including a vertical stabilizer 42 and a pair of horizontal stabilizers 44 extending outwardly from either side of tail 40, a pair of wings 50 extending outwardly from either side of fuselage 20, an exhaust system 60 including a fuselage portion 62 and/or a wing portion 64, a pair of wheel assemblies 70, and a hydrogen fuel cell-powered electric engine system 100.

Figure 1B:
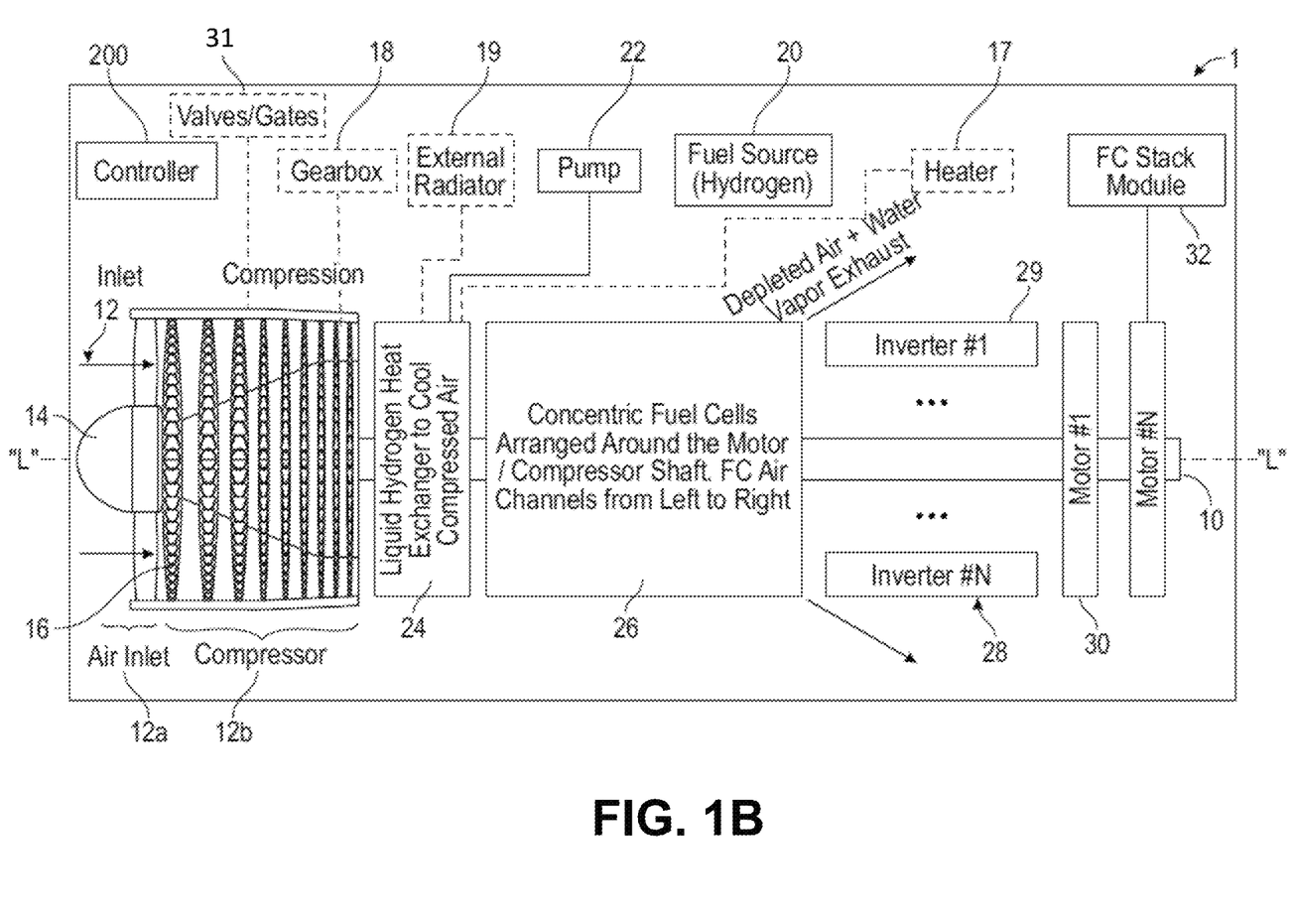
FIG. 1B is a schematic view of an integrated hydrogen-electric engine system of the hydrogen fuel cell-powered aircraft of FIG. 1A, in accordance with an embodiment.

With reference now to FIG. 1B, a block diagram of an integrated hydrogen-electric engine system 1 is shown in accordance with one embodiment. In one embodiment, integrated hydrogen-electric engine system 1 is utilized, for example, in a turboprop or turbofan system, to provide a streamlined, lightweight, power-dense, and efficient system. In general, integrated hydrogen-electric engine system 1 includes an elongated shaft 10 that defines a longitudinal axis "L" and extends through the entire powertrain of integrated hydrogen-electric engine system 1 to function as a common shaft for the various components of the powertrain. Elongated shaft 10 supports propulsor 14 (e.g., a fan or propeller) and a multi-stage air compressor system 12, a pump 22 in fluid communication with a fuel source (e.g., hydrogen), a heat exchanger 24 in fluid communication with air compressor system 12, a fuel cell stack 26 in fluid communication with heat exchanger 24, and a motor assembly 30 disposed in electrical communication with the fuel cell stack 26.

Air compressor system 12 of integrated hydrogen-electric engine system 1 includes an air inlet portion 12a at a distal end thereof and a compressor portion 12b that is disposed proximally of air inlet portion 12a for uninterrupted, axial delivery of airflow in the proximal direction. Compressor portion 12b supports a plurality of longitudinally spaced-apart rotatable compressor wheels 16 (e.g., multi-stage) that rotate in response to rotation of elongated shaft 10 for compressing air received through air inlet portion 12a for pushing the compressed air to a fuel cell stack 26 for conversion to electrical energy.

In one embodiment, the number of compressor wheels/stages 16 and/or diameter, longitudinal spacing, and/or configuration thereof can be modified as desired to change the amount of air supply, and the higher the power, the bigger the propulsor 14. These compressor wheels 16 can be implemented as axial or centrifugal compressor stages. Further, the compressor can have one or more bypass valves and/or wastegates 31 to regulate the pressure and flow of the air that enters the downstream fuel cell stack 26, as well as to manage the cold air supply to any auxiliary heat exchangers in the system.

Compressor system 12 can optionally be mechanically coupled to elongated shaft 10 via a gearbox 18 to change (increase and/or decrease) compressor turbine rotations per minute (RPM) and to change the airflow to fuel cell stack 26. For instance, gearbox 18 can be configured to enable the airflow, or portions thereof, to be exhausted for controlling a rate of airflow through the fuel cell stack 26, and thus, the output power.

Integrated hydrogen-electric engine system 1 further includes a gas management system such as a heat exchanger 24 disposed concentrically about elongated shaft 10 and configured to control thermal and/or humidity characteristics of the compressed air from air compressor system 12 for conditioning the compressed air before entering fuel cell stack 26. Integrated hydrogen-electric engine system 1 further also includes a fuel source 20 of fuel cryogenic (e.g., liquid hydrogen (LH2), or cold hydrogen gas) that is operatively coupled to heat exchanger 24 via a pump 22 configured to pump the fuel from fuel source 20 to heat exchanger 24 for conditioning compressed air. In particular, the fuel, while in the heat exchanger 24, becomes gasified because of heating (e.g., liquid hydrogen converts to gas) to take the heat out of the system.

In one embodiment, the hydrogen gas is heated in the heat exchanger 24 to a working temperature of the fuel cell stack 26, which also takes heat out of the compressed air, which results in control of flow through the heat exchanger 24. In one embodiment, a heater 17 can be coupled to or included with heat exchanger 24 to increase the heat as necessary, for instance, when running under a low power regime. Additionally, and/or alternatively, motor assembly 28 can be coupled to heat exchanger 24 for looping in the cooling/heating loops from motor assembly 28 as necessary. Such heating/cooling control can be managed, for instance, via controller 200 of integrated hydrogen-electric engine system 1. In one embodiment, fuel source 20 can be disposed in fluid communication with motor assembly 28 or any other suitable component to facilitate cooling of such components.

Pump 22 can also be coaxially supported on elongated shaft 10 for actuation thereof in response to rotation of elongated shaft 10. Heat exchanger 24 is configured to cool the compressed air received from air compressor system 12 with the assistance of the pumped liquid hydrogen.

In one embodiment, integrated hydrogen-electric engine system 1 further includes an energy core in the form of a fuel cell stack 26, which may be circular, and is also coaxially supported on elongated shaft 10 (e.g., concentric) such that any air channels of fuel cell stack 26 may be oriented in parallel relation with elongated shaft 10 (e.g., horizontally or left-to-right). Fuel cell stack 26 may be in the form of a proton-exchange membrane fuel cell (PEMFC). The fuel cells of the fuel cell stack 26 are configured to convert chemical energy liberated during the electrochemical reaction of hydrogen and oxygen to electrical energy (e.g., direct current). Depleted air and water vapor are exhausted from fuel cell stack 26. The electrical energy generated from fuel cell stack 26 is then transmitted to the motor assembly, which is also coaxially/concentrically supported on elongated shaft 10.

In one embodiment, integrated hydrogen-electric engine system 1 may include any number of external radiators 19 for facilitating airflow and adding, for instance, additional cooling. Notably, fuel cell stack 26 can include liquid-cooled and/or air-cooled cell types so that cooling loads are integrated into heat exchanger 24 for reducing the total amount of external radiators needed in the system.

The motor assembly of integrated hydrogen-electric engine system 1 includes a plurality of inverters 28 and 29 configured to convert the direct current to alternating current for actuating one or more of a plurality of motors 30 in electrical communication with the inverters 28 and 29. The plurality of motors 30 are configured to drive (e.g., rotate) the elongated shaft 10 in response to the electrical energy received from fuel cell stack 26 for operating the components on the elongated shaft 10 as elongated shaft 10 rotates.

In one embodiment, one or more of the inverters 28 and 29 may be disposed between motors 30 (e.g., a pair of motors) to form a motor subassembly, although any suitable arrangement of motors 30 and inverters 28 and 29 may be provided. The motor assembly can include any number of motor subassemblies supported on elongated shaft 10 for redundancy and/or safety. In one embodiment, the motor assembly can include any number of fuel cell stack modules 32 configured to match the power of the motors 30 and the inverters 28 and 29 of the subassemblies. In this regard, for example, during service, the fuel cell stack modules 32 can be swapped in/out. Each fuel cell stack modules 32 can provide any power, such as 400 kw or any other suitable amount of power, such that when stacked together (e.g., 4 or 5 modules), total power can be about 2 Megawatts on the elongated shaft 10. In embodiments, motors 30 and inverters 28 and 29 can be coupled together and positioned to share the same thermal interface so a motor casing of the motors 30 is also an inverter heat sink so only a single cooling loop goes through the motor assembly for cooling the inverters 29 and the motors 30 at the same time. This reduces the number of cooling loops and therefore the complexity of the system.

Integrated hydrogen-electric engine system 1 further includes a controller 200 (e.g., a full authority digital engine (or electronics) control (e.g., a FADEC) for controlling the various embodiments of the integrated hydrogen-electric engine system 1 and/or other components of the aircraft system. For instance, controller 200 can be configured to manage a flow of liquid hydrogen, manage coolant liquids from the motor assembly, manage, for example, any dependent auxiliary heater for the liquid hydrogen, manage rates of hydrogen going into fuel cell stack 26, manage rates of heated/cooled compressed air, and/or various flows and/or power of integrated hydrogen-electric engine system 1.

In one embodiment, managing these thermal management components is designed to ensure the most efficient use of the various cooling and heating capacities of the respective gases and liquids to maximize the efficiency of the system and minimize the volume and weight of the same. For example, the cooling capacity of liquid hydrogen or cool hydrogen gas (post-gasification) can be effectively used to cool the hot compressor discharge air to ensure the correct temperature range in the fuel cell inlet. Further, the cooling liquid from the motor-inverter cooling loop could be integrated into the master heat exchanger and provide the additional heat required to gasify hydrogen and heat it to the working fuel cell temperature.

Figure 2:
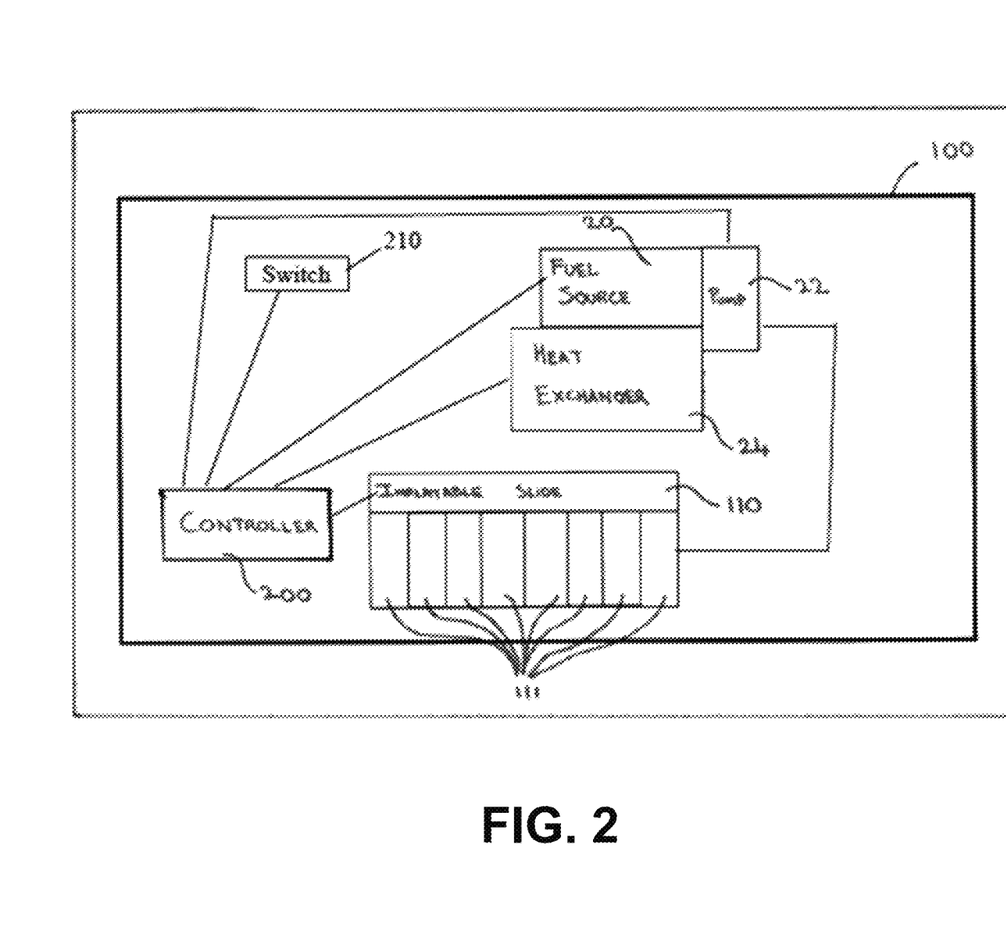
FIG. 2 is a schematic view of an aircraft evacuation system of the hydrogen fuel cell-powered aircraft of FIG. 1A, in accordance with an embodiment.

Referring now to FIG. 2, a block diagram of an aircraft evacuation system 100 that can be utilized in a commercial aircraft employing an integrated hydrogen-electric engine system 1 is shown in accordance with one embodiment. In one embodiment, by leveraging engine by-products as a source of pressurized liquid/gas to inflate emergency equipment, aircrafts employing integrated hydrogen-electric engine systems 1 can further reduce the overall weight of the aircraft and providing a streamlined, light weight, power dense and efficient system.

In one embodiment, the aircraft evacuation system 100 repurposes hydrogen used to operate the integrated hydrogen-electric engine system 1 in order to rapidly deploy an inflatable slide 110 in emergency situations where the typical means of off-boarding passengers from the aircraft (e.g., an elevated walkway, or a mobile stairway) are unavailable. For example, the aircraft evacuation system 100 is configured to utilize the hydrogen stored in the hydrogen fuel source 20 to inflate one or more inflatables (e.g., inflatable slides 110) of aircraft evacuation system 100, via, pump 22, for example.

In one embodiment, inflatables may include in watercraft such as inflatable rafts, floats, vests, etc. that can be utilized for providing floatation after a water landing. In one embodiment, aircraft 11 may include a valve in fluid communication with pump 22 to enable inflatables to be manually inflated via inflation ports of the inflatables by manually and/or autonomously opening such a valve (e.g., via switch 210) and positioning the hydrogen in fluid communication with these inflation ports.

Figure 3:
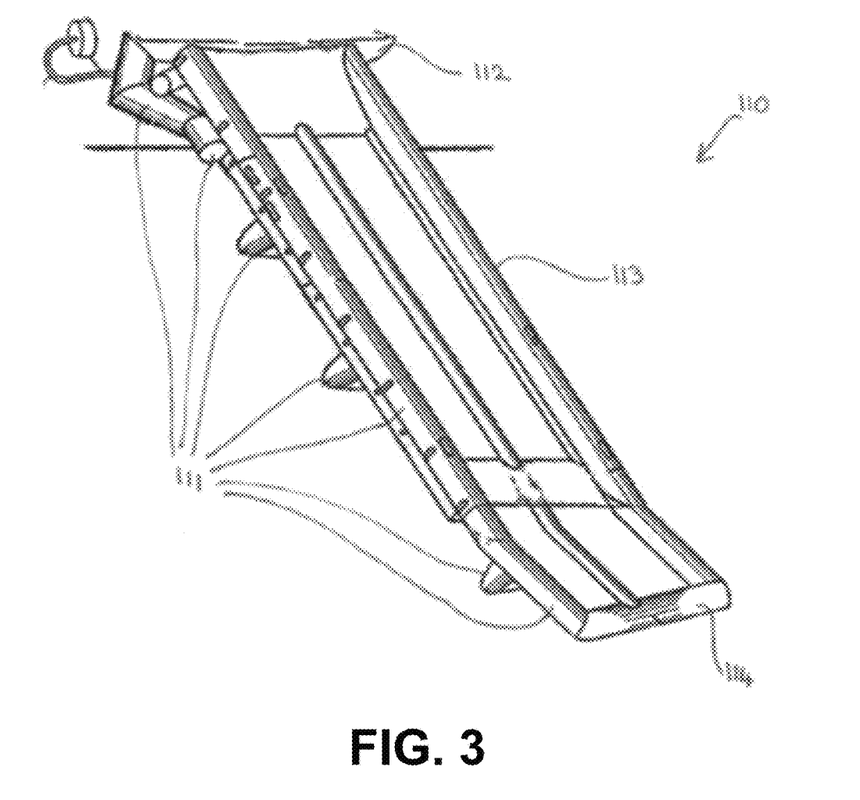
FIG. 3 is a perspective view of an inflatable slide of the aircraft evacuation system of FIG. 2 shown in an inflated configuration, in accordance with an embodiment.
Figure 4:
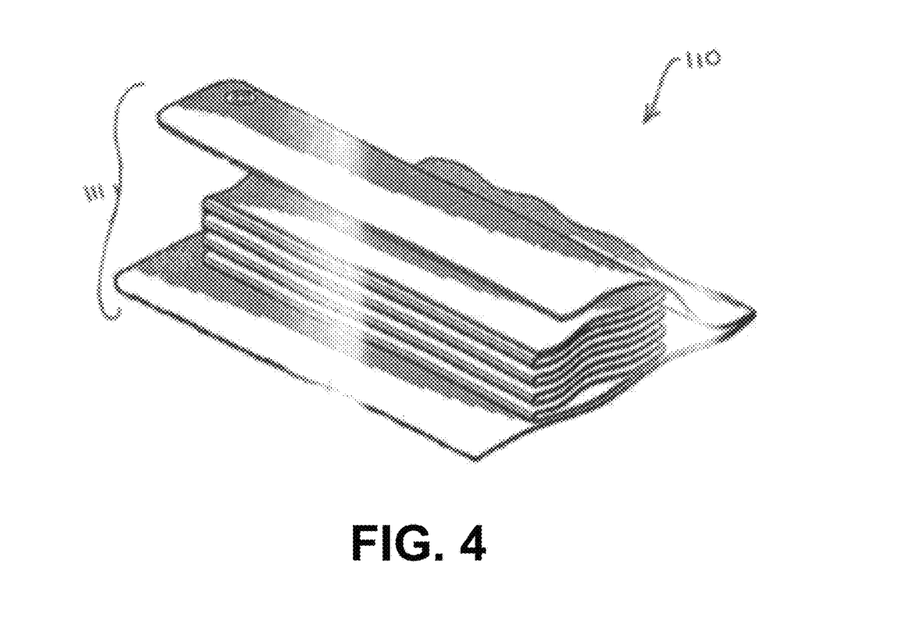
FIG. 4 is a perspective view of the inflatable slide of FIG. 3 in an uninflated and folded configuration, in accordance with an embodiment.

In one embodiment, the aircraft evacuation system 100 can route gasified hydrogen from the fuel source 20 and/or heat exchanger 24 to the inflatable slide 110 for inflation thereof. With reference also to FIGS. 3 and 4, respectively, the inflatable slide 110 is shown in an inflated configuration (e.g., fully deployed as shown in FIG. 3) and in an uninflated and folded configuration for compact storage (as shown in FIG. 4).

Post-inflation, as shown in FIG. 3, the inflatable slide 110 has an elevated proximal end 112 meant to provide passengers a starting or egress point level with the aircraft, a declining central portion 113 for passengers to gradually descend along, and a lowered distal end 114 for supporting the inflatable slide 110 on ground or another surface. In one embodiment, the inflatable slide 110 can include several inflatable segments 111 that inflate in a predetermined order to force the inflatable slide 110 to unfurl outwardly from the elevated proximal end 112 down to the lowered distal end 114. In one embodiment, the inflatable slide 110 may be a single continuous material that expands uniformly.

In one embodiment, integrated hydrogen-electric engine system 1 includes a controller 200, e.g., a full authority digital engine (or electronics) control (e.g., a FADEC) for controlling one or more aspects of the integrated hydrogen-electric engine system 1 and/or other components of aircraft system including how and when inflatable slide 110 is deployed. For example, controller 200 can be configured to manage, for example, a rate of flow of hydrogen delivered to fuel cell stack 26 and/or inflatable slide 110, a rate of heated/cooled compressed air, and/or various flows and/or power of integrated hydrogen-electric engine system 1.

In one embodiment, the controller 200 is used to ensure the most efficient use of these components to maximize the efficiency of the system and minimize the volume and weight of same. For example, the cooling capacity of liquid hydrogen or cool hydrogen gas can be effectively used to cool the hot compressor discharge air to ensure the correct temperature range in the fuel cell inlet. Further, the cooling liquid from the motor-inverter cooling loop could be integrated into the master heat exchanger and provide additional heat required to gasify hydrogen and heat it to the working fuel cell temperature.

Referring again to FIG. 2, controller 200 can be operatively coupled to a switch 210 (e.g., a valve), which may be manually and/or autonomously actuated to cause pump 22 to inflate inflatables such as inflation slide 110. Autonomous actuation of switch 210 may be effectuated based on one or more predetermined conditions of hydrogen fuel cell-powered aircraft 11. Such predetermined conditions can include, for example, an opening of an emergency access door or window, after an alert or failure of one or more components, after one or more crash sensors are activated, etc.

Figure 5:
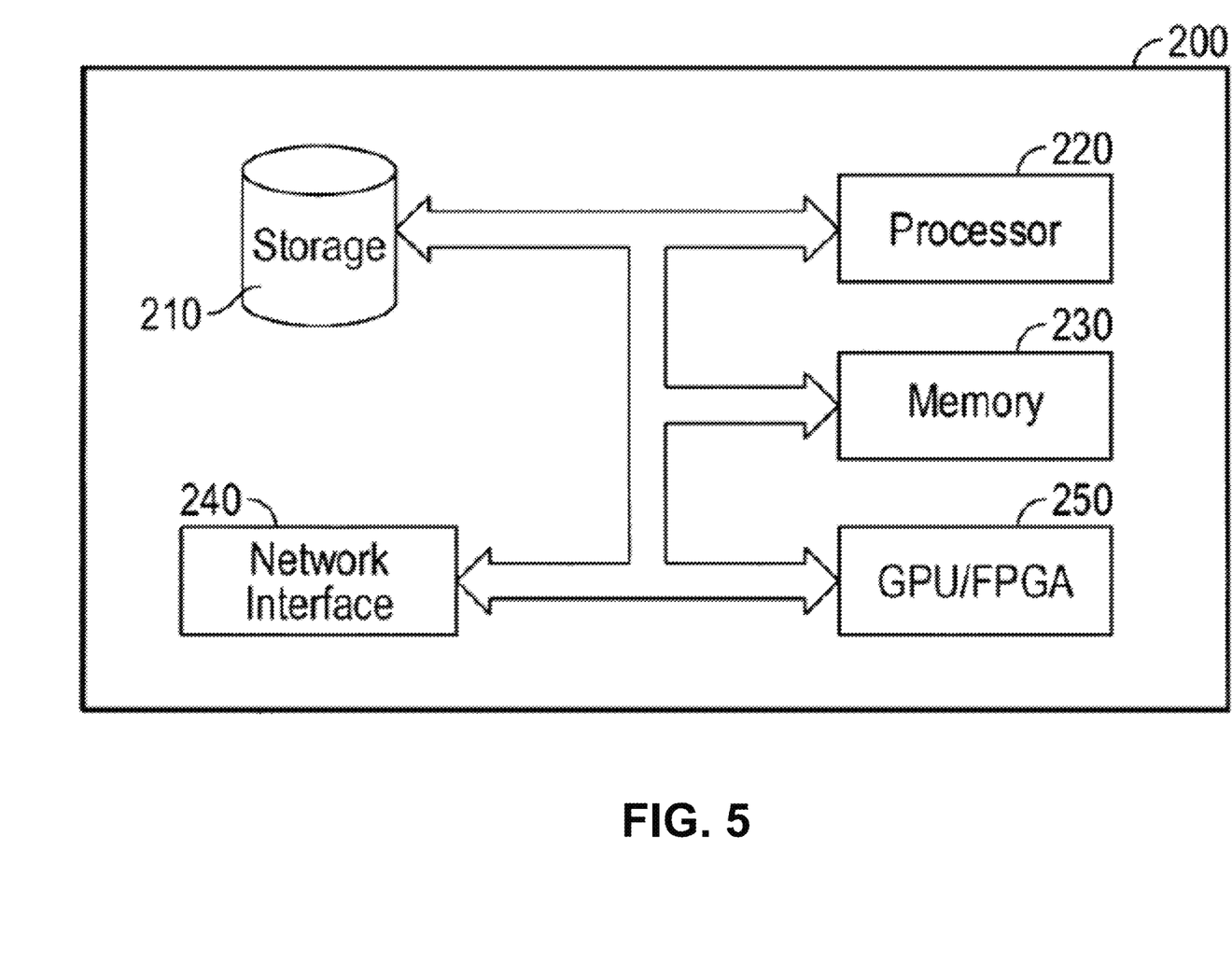
FIG. 5 is a block diagram of a controller of the hydrogen fuel cell-powered aircraft of FIG. 1A, in accordance with an embodiment.

FIG. 5 illustrates that controller 200 includes a processor 220 connected to a computer-readable storage medium or a memory 230. The computer-readable storage medium or memory 230 may be a volatile type of memory, e.g., RAM, or a non-volatile type memory, e.g., flash media, disk media, etc. In one embodiment, the processor 220 may be another type of processor such as, without limitation, a digital signal processor, a microprocessor, an ASIC, a central processing unit (CPU), or the like. In one embodiment, controller 200 includes a graphics processing unit (GPU)/field-programmable gate array (FPGA) 250. In one embodiment, processor 220 is a GPU/FPGA such as GPU/FPGA 250. In one embodiment, network inference may also be accomplished in systems that have weights implemented as memristors, chemically, or other inference calculations, as opposed to processors.

In one embodiment, the memory 230 can be random access memory, read-only memory, magnetic disk memory, solid-state memory, optical disc memory, and/or another type of memory. In one embodiment, the memory 230 can be separate from the controller 200 and can communicate with the processor 220 through communication buses of a circuit board and/or through communication cables such as serial ATA cables or other types of cables. The memory 230 includes computer-readable instructions that are executable by the processor 220 to operate the controller 200. In one embodiment, the controller 200 may include a network interface 240 to communicate with other computers or to a server. A storage device 210 may be used for storing data.

The disclosed method may run on the controller 200 or on a user device, including, for example, a mobile device, an IoT device, a server system, or the like.

In one embodiment, controller 200 is configured to receive, among other data, the fuel supply status, aircraft location, and control, among other features, the pumps, motors, sensors, etc.

Further, as can be appreciated, the integrated hydrogen-electric engine system 1 can include any number and/or type of sensors, electrical components, and/or telemetry devices that are operatively coupled to controller 200 for facilitating the control, operation, and/or input/out of the various components of integrated hydrogen-electric engine system 1 for improving efficiencies and/or determining errors and/or failures of the various components.

For a more detailed description of components of similar hydrogen-electric engine systems, one or more components of which can used or modified for use with the structure of the present disclosure, reference can be made, for example, to U.S. patent application Ser. No. 16/950,735.

It should be understood the disclosed structure can include any suitable mechanical, electrical, and/or chemical components for operating the disclosed system or components thereof. For instance, such electrical components can include, for example, any suitable electrical and/or electromechanical and/or electrochemical circuitry, which may include or be coupled to one or more printed circuit boards. As appreciated, the disclosed computing devices and/or server can include, for example, a "controller," "processor," "digital processing device" and like terms, and which are used to indicate a microprocessor or central processing unit (CPU).

In one embodiment, the CPU is the electronic circuitry within a computer that carries out the instructions of a computer program by performing the basic arithmetic, logical, control and input/output (I/O) operations specified by the instructions, and by way of non-limiting examples, include server computers. In one embodiment, the controller includes an operating system configured to perform executable instructions. The operating system is, for example, software, including programs and data, which manages hardware of the disclosed apparatus and provides services for execution of applications for use with the disclosed apparatus. Those of skill in the art will recognize that suitable server operating systems include, by way of non-limiting examples, FreeBSD, OpenBSD, NetBSD®, Linux, Apple® Mac OS X Server®, Oracle® Solaris®, Windows Server®, and Novell® NetWare®. In one embodiment, the operating system is provided by cloud computing.

In one embodiment, the term "controller" may be used to indicate a device that controls the transfer of data from a computer or computing device to a peripheral or separate device and vice versa, and/or a mechanical and/or electromechanical device (e.g., a lever, knob, etc.) that mechanically operates and/or actuates a peripheral or separate device.

In one embodiment, the controller includes a storage and/or memory device. The storage and/or memory device is one or more physical apparatus used to store data or programs on a temporary or permanent basis. In one embodiment, the controller includes volatile memory and requires power to maintain stored information. In one embodiment, the controller includes non-volatile memory and retains stored information when it is not powered. In one embodiment, the non-volatile memory includes flash memory. In one embodiment, the non-volatile memory includes dynamic random-access memory (DRAM). In one embodiment, the non-volatile memory includes ferroelectric random-access memory (FRAM). In one embodiment, the non-volatile memory includes phase-change random access memory (PRAM). In one embodiment, the controller is a storage device including, by way of non-limiting examples, CD-ROMs, DVDs, flash memory devices, magnetic disk drives, magnetic tapes drives, optical disk drives, and cloud-computing-based storage. In one embodiment, the storage and/or memory device is a combination of devices such as those disclosed herein.

In one embodiment, the memory can be random access memory, read-only memory, magnetic disk memory, solid state memory, optical disc memory, and/or another type of memory. In one embodiment, the memory can be separate from the controller and can communicate with the processor through communication buses of a circuit board and/or through communication cables such as serial ATA cables or other types of cables. The memory includes computer-readable instructions that are executable by the processor to operate the controller. In one embodiment, the controller may include a wireless network interface to communicate with other computers or a server. In one embodiment, a storage device may be used for storing data. In one embodiment, the processor may be, for example, without limitation, a digital signal processor, a microprocessor, an ASIC, a graphics processing unit ("GPU"), field-programmable gate array ("FPGA"), or a central processing unit ("CPU").

The memory stores suitable instructions, to be executed by the processor, for receiving the sensed data (e.g., sensed data from GPS, camera, etc. sensors), accessing storage device of the controller, generating a raw image based on the sensed data, comparing the raw image to a calibration data set, identifying an object based on the raw image compared to the calibration data set, transmitting object data to a ground-based post-processing unit, and displaying the object data to a graphic user interface. Although illustrated as part of the disclosed structure, in one embodiment, a controller may be remote from the disclosed structure (e.g., on a remote server), and accessible by the disclosed structure via a wired or wireless connection. In one embodiment where the controller is remote, it may be accessible by, and connected to, multiple structures and/or components of the disclosed system.

The term "application" may include a computer program designed to perform particular functions, tasks, or activities for the benefit of a user. Application may refer to, for example, software running locally or remotely, as a stand-alone program or in a web browser, or other software which would be understood by one skilled in the art to be an application. An application may run on the disclosed controllers or on a user device, including for example, on a mobile device, an IoT device, or a server system.

In one embodiment, the controller includes a display to send visual information to a user. In one embodiment, the display is a cathode ray tube (CRT). In one embodiment, the display is a liquid crystal display (LCD). In one embodiment, the display is a thin film transistor liquid crystal display (TFT-LCD). In one embodiment, the display is an organic light-emitting diode (OLED) display. In one embodiment, on OLED display is a passive-matrix OLED (PMOLED) or active-matrix OLED (AMOLED) display. In one embodiment, the display is a plasma display. In one embodiment, the display is a video projector. In one embodiment, the display is interactive (e.g., having a touch screen or a sensor such as a camera, a 3D sensor, a LiDAR, a radar, etc.) that can detect user interactions/gestures/responses and the like. In one embodiment, the display is a combination of devices such as those disclosed herein.

The controller may include or be coupled to a server and/or a network. As used herein, the term "server" includes "computer server," "central server," "main server," and like terms to indicate a computer or device on a network that manages the disclosed apparatus, components thereof, and/or resources thereof. As used herein, the term "network" can include any network technology including, for instance, a cellular data network, a wired network, a fiber-optic network, a satellite network, and/or an IEEE 802.11a/b/g/n/ac wireless network, among others.

In one embodiment, the controller can be coupled to a mesh network. As used herein, a "mesh network" is a network topology in which each node relays data for the network. In general, mesh nodes cooperate in the distribution of data in the network. It can be applied to both wired and wireless networks. Wireless mesh networks can be considered a type of "Wireless ad hoc" network. Thus, wireless mesh networks are closely related to Mobile ad hoc networks (MANETs). Although MANETs are not restricted to a specific mesh network topology, Wireless ad hoc networks or MANETs can take any form of network topology. Mesh networks can relay messages using either a flooding technique or a routing technique. With routing, the message is propagated along a path by hopping from node to node until it reaches its destination. To ensure that all its paths are available, the network must allow for continuous connections and must reconfigure itself around broken paths, using self-healing algorithms such as Shortest Path Bridging. Self-healing allows a routing-based network to operate when a node breaks down or when a connection becomes unreliable. As a result, the network is typically quite reliable, as there is often more than one path between a source and a destination in the network. This concept can also apply to wired networks and to software interaction. A mesh network whose nodes are all connected to each other is a fully connected network.

In one embodiment, the controller may include one or more modules. As used herein, the term "module" and like terms are used to indicate a self-contained hardware component of the central server, which in turn includes software modules. In software, a module is a part of a program. Programs are composed of one or more independently developed modules that are not combined until the program is linked. A single module can contain one or several routines or sections of programs that perform a particular task.

In one embodiment, the controller includes software modules for managing various functions of the disclosed system or components thereof.

The disclosed structure may also utilize one or more controllers to receive various information and transform the received information to generate an output. The controller may include any type of computing device, computational circuit, or any type of processor or processing circuit capable of executing a series of instructions that are stored in memory. The controller may include multiple processors and/or multicore central processing units (CPUs) and may include any type of processor, such as a microprocessor, digital signal processor, microcontroller, programmable logic device (PLD), field programmable gate array (FPGA), or the like. The controller may also include a memory to store data and/or instructions that, when executed by the one or more processors, cause the one or more processors to perform one or more methods and/or algorithms.

The present technology may be described in the general context of computer-executable instructions, such as program modules, being executed by a computer. Generally, program modules include routines, programs, objects, components, data structures, etc., that perform particular tasks or implement particular abstract data types. The present technology may also be practiced in distributed computing environments where tasks are performed by remote processing devices that are linked through a communications network. In a distributed computing environment, program modules may be located in both local and remote computer-storage media including memory-storage devices.

In one embodiment, the described methods, programs, systems, codes, and the like may be converted to, or expressed in, a programming language or computer program. The terms "programming language" and "computer program," as used herein, each include any language used to specify instructions to a computer, and include (but is not limited to) the following languages and their derivatives: Assembler, Basic, Batch files, BCPL, C, C+, C++, Delphi, Fortran, Java, JavaScript, machine code, operating system command languages, Pascal, Perl, PL1, scripting languages, Visual Basic, metalanguages which themselves specify programs, and all first, second, third, fourth, fifth, or further generation computer languages. Also included are database and other data schemas, and any other meta-languages. No distinction is made between languages which are interpreted, compiled, or use both compiled and interpreted approaches. No distinction is made between compiled and source versions of a program. Thus, reference to a program, where the programming language could exist in more than one state (such as source, compiled, object, or linked) is a reference to any and all such states. Reference to a program may encompass the actual instructions and/or the intent of those instructions.

The examples set forth herein were presented in order to best explain, to describe particular applications, and to thereby enable those skilled in the art to make and use embodiments of the described examples. However, those skilled in the art will recognize that the foregoing description and examples have been presented for the purposes of illustration and example only. The description as set forth is not intended to be exhaustive or to limit the embodiments to the precise form disclosed. Rather, the specific features and acts described above are disclosed as example forms of implementing the Claims.

Reference throughout this document to "one embodiment," "certain embodiments," "an embodiment," "various embodiments," "some embodiments," "various embodiments", or similar term, means that a particular feature, structure, or characteristic described in connection with that embodiment is included in at least one embodiment. Thus, the appearances of such phrases in various places throughout this specification are not necessarily all referring to the same embodiment. Furthermore, the particular features, structures, or characteristics of any embodiment may be combined in any suitable manner with one or more other features, structures, or characteristics of one or more other embodiments without limitation.

What is claimed is:

1. A system comprising:
    an aircraft having an integrated hydrogen-electric engine;
    a fuel cell stack for powering an aircraft motor of said integrated hydrogen-electric engine;
    a hydrogen fuel source in fluid communication with said fuel cell stack, said hydrogen fuel source containing hydrogen;
    an inflatable slide; and
    a pump operably coupled with said hydrogen fuel source and said inflatable slide to selectively pump said hydrogen to said inflatable slide for inflating said inflatable slide.

2. The system of claim 1, further comprising:
    a heat exchanger in fluid communication with said pump.

3. The system of claim 1, further comprising:
    a controller disposed in electrical communication with said pump.

4. The system of claim 3, wherein said controller is configured to cause said pump to deliver hydrogen to said inflatable slide.

5. The system of claim 4, further comprising:
    a switch operatively coupled with said controller, said switch, which when actuated, to cause said inflatable slide to be inflated.

6. The system of claim 5, wherein said switch is manually actuatable.

7. The system of claim 5, wherein said controller is configured to autonomously actuate said switch based upon a predetermined condition of said aircraft.

8. The system of claim 1, wherein said inflatable slide includes a plurality of inflatable segments.

9. The system of claim 8, wherein said inflatable slide, when inflated, comprises:

an elevated proximal end coupled with a portion of said aircraft;

a declining central portion; and a lowered distal end configured to support said inflatable slide on a ground.

10. The system of claim 8, wherein said inflatable slide is configured to be stored on said aircraft in an uninflated condition.

11. A system comprising:

an aircraft having an integrated hydrogen-electric engine;

a fuel cell stack for powering an aircraft motor of said integrated hydrogen-electric engine;

a hydrogen fuel source in fluid communication with said fuel cell stack, said hydrogen fuel source containing hydrogen;

an inflatable slide;

a pump operably coupled with said hydrogen fuel source and said inflatable slide to selectively pump said hydrogen to said inflatable slide for inflating said inflatable slide; and a controller disposed in electrical communication with said pump, wherein said controller is configured to cause said pump to deliver hydrogen to said inflatable slide.

12. The system of claim 11, further comprising:

a switch operatively coupled with said controller, said switch, which when actuated, to cause said inflatable slide to be inflated.

13. The system of claim 12, wherein said switch is manually actuatable.

14. The system of claim 12, wherein said controller is configured to autonomously actuate said switch based upon a predetermined condition of said aircraft.

* * * * *